Dec. 16, 1958

A. WOLINSKY 2,865,020

AIRCRAFT VERTICAL VELOCITY AND DRIFT
ANGLE MEASURING SYSTEM

Filed Aug. 13, 1956

INVENTOR.
ALBERT WOLINSKY
BY
ATTORNEY

INVENTOR.
ALBERT WOLINSKY
BY
ATTORNEY

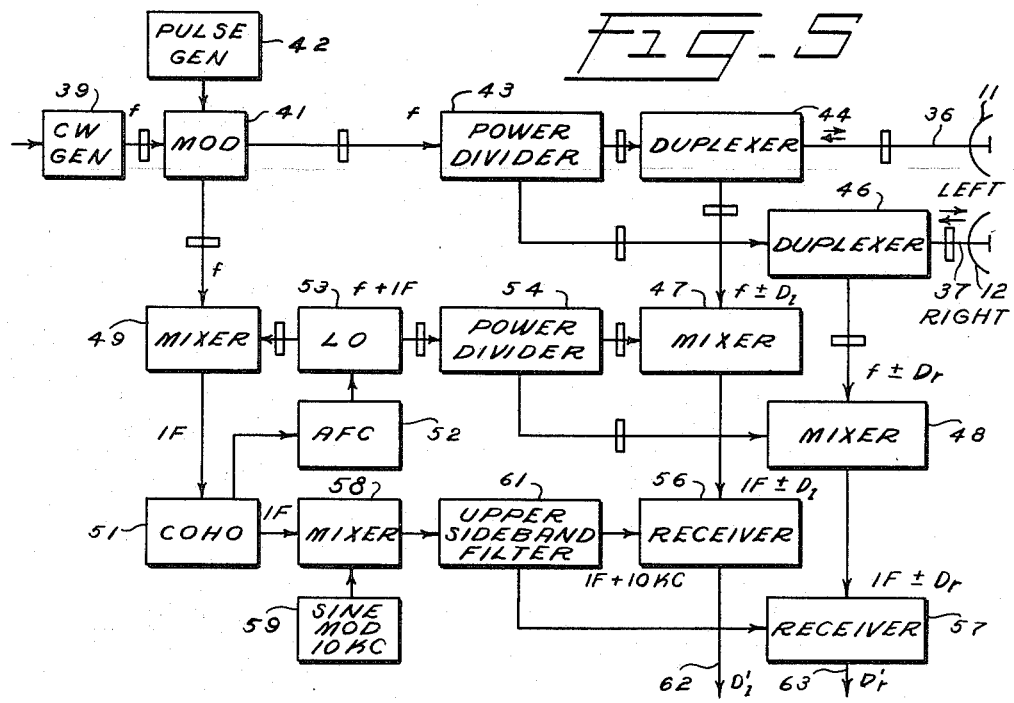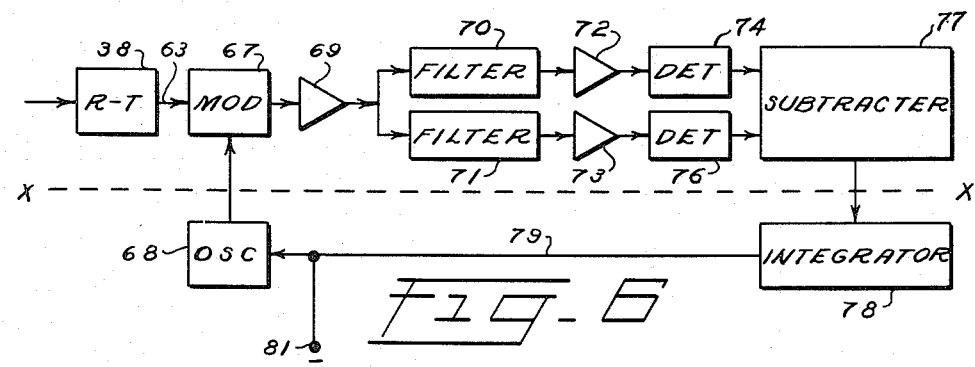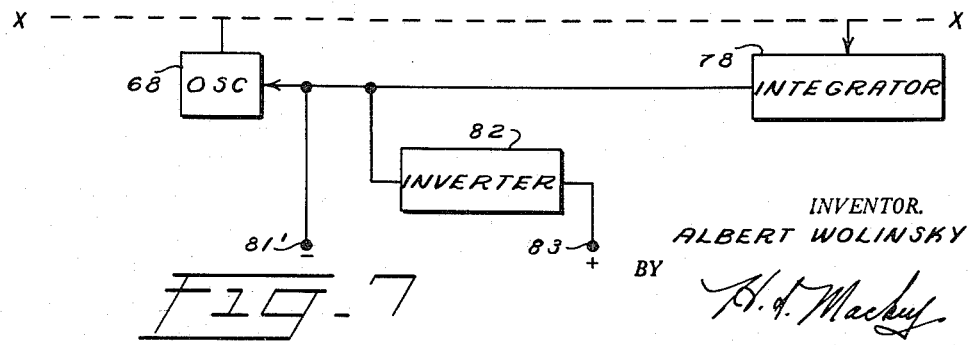

United States Patent Office 2,865,020
Patented Dec. 16, 1958

2,865,020

AIRCRAFT VERTICAL VELOCITY AND DRIFT ANGLE MEASURING SYSTEM

Albert Wolinsky, New Rochelle, N. Y., assignor to General Precision Laboratory Incorporated, a corporation of New York Application August 13, 1956, Serial No. 603,583

8 Claims. (Cl. 343—9)

This invention relates to self-contained aircraft systems for measuring vertical velocity and horizontal drift angle.

The principal object of this invention is to provide microwave apparatus, wholly carried on an aircraft, for measuring the aircraft vertical velocity and drift angle, and for providing continuous signals and indications representing these quantities.

Another object is to provide microwave apparatus emitting two microwave beams for measuring vertical velocity and drift angle neither measurement being affected by variations of the microwave frequency.

The apparatus provided by this invention includes an antenna comprising two linear arrays radiating two beams of microwave energy toward the earth. These beams may be either continuous or pulsed. In a preferred antenna the two arrays are parallel and horizontally stabilized, and at null their beams point along the cross track on opposite sides of the ground track.

Other configurations of antennas may be employed to measure drift angle. such as an antenna consisting of two horizontally stabilized linear arrays positioned at an arbitrary angle bisected by the ground track direction. However, in this case the ability to measure vertical velocity is lost.

When the above-described preferred antenna is employed, earth reflections are received and are separately and coherently demodulated to derive two separate currents having frequencies representing the Doppler components in the earth reflections. From each current is derived a potential magnitude representing the current frequency. These two potential magnitudes are subtracted to form a difference error signal, which is applied to an azimuth servomechanism including an electric motor. This motor rotates the antenna in obedience to the error signal until the antenna is accurately aligned at right angles to the aircraft ground track direction. When this has been accomplished the error signal disappears, and an indication of the antenna position relative to the aircraft axis constitutes drift angle indication.

The two potential magnitudes are also combined in addition, and their sum represents the magnitude of the aircraft vertical velocity. Vertical velocity is directly indicated by a voltmeter having a scale calibrated in units of vertical velocity.

In the ordinary microwave Doppler system both the Doppler frequency and the angle of the microwave beam are affected by changes in the transmitted microwave frequency. However, the present system makes use of microwave beams of such nature and combines them in such a way as to make the velocity and drift angle outputs independent of such microwave frequency changes. This is a practical point of great importance, for normal variations in present microwave generators would otherwise interpose an insurmountable barrier to the attainment of reasonable accuracy in the output values.

A further understanding of this invention may be secured by reference to the following detailed description, together with the associated drawings, in which.

Figure 5 schematically depicts a receiver-transmitter for use with the invention.

Figures 6 and 7 schematically depict frequency trackers for use with the invention.

Figure 1:
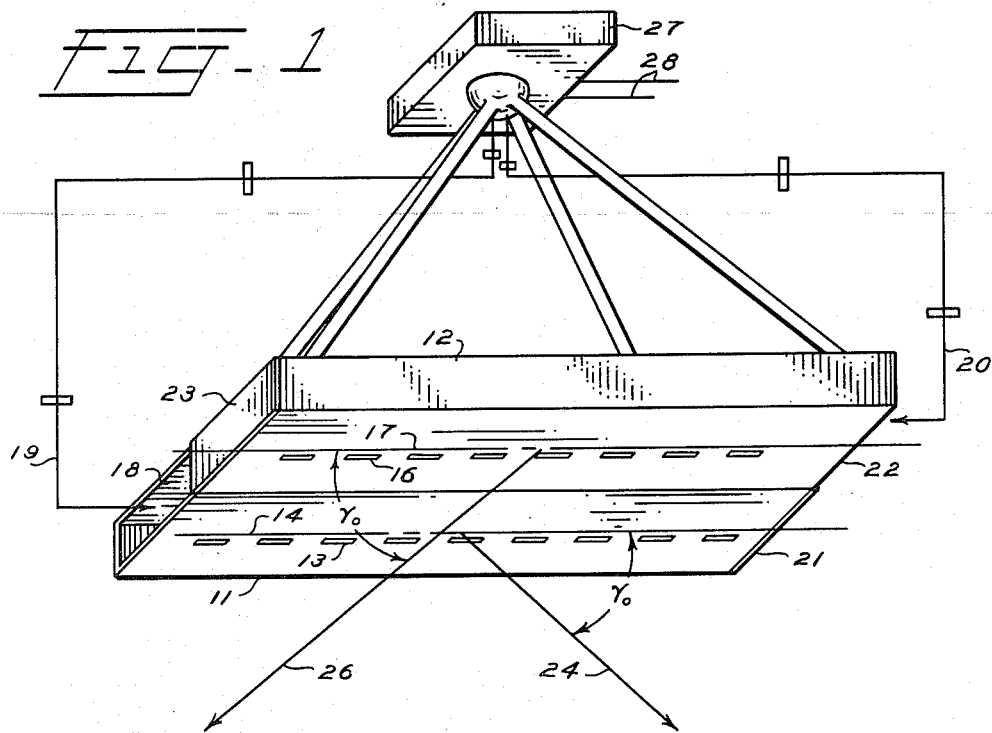
Figure 1 is an oblique drawing of one antenna for use with the invention, together with its stabilization device, showing the radiated microwave beam direction.

Referring now to Fig. 1, two linear arrays formed of hollow rectangular microwave waveguides 11 and 12 are positioned side by side with their lower broad sides in the same horizontal plane. Each array comprises a series of radiators all having the same coupling phase and being equally spaced in substantially a straight line on the lower broad side of the waveguide. Such a linear array is sometimes termed an in-phase array. As an example, shunt slot radiators may be employed as depicted. Array 11 comprises shunt slots 13, all of which are positioned on the same side of the center line 14 of the lower broad face of the waveguide and are spaced from the center line by suitable coupling distances in accordance with the selected illumination pattern. Array 12 is similar to array 11 with the shunt slots 16 all on the same side of the center line 17.

Linear array 11 is fed at its left end 18 by microwave energy of a selected frequency $f$ and corresponding wavelength in free space $\lambda$ through a waveguide line 19, and any energy remaining at the right end after traversing and feeding array 11 is absorbed by a pad 21 of ferrite, carbon, or other non-reflective material closing the end of the waveguide. Linear array 12 is fed at its right end 22 from the same microwave source through waveguide line 20. The left end 23 is like-wise nonreflectively terminated.

An in-phase linear array such as described and having selected parameters emits a single microwave beam of radiation, with its maximum in the normal plane comprehending the waveguide longitudinal center line and pointing away from the feed end. Thus the beam represented by arrow 24 of linear array 11 is at an acute angle $\gamma_0$ to center line 14, and beam 26 of array 12 is at the same acute angle $\gamma_0$ to its waveguide center line 17, the two beams being on opposite sides of the line normal to the broad faces of the waveguides. The center lines 14 and 17 may be considered as coincident in describing beam behavior at all ordinary aircraft altitudes.

The pair of linear in-phase arrays 11 and 12 constitutes an antenna which is suitable for use in the instant vertical velocity and drift angle measuring system. If such an antenna with reflectors should be employed it would be suitable for measurement of vertical velocity, but not of drift angle. If an antenna consisting of two anti-phase arrays, having successive radiators of opposing phases, were employed, it would be suitable for measurement of drift angle, but not of vertical velocity.

The antenna is mounted in the aircraft and is stabilized or maintained in its horizontal plane by conventional means, indicated by the box 27, which most simply comprises a pendulous vertical reference, pitch and roll motors, and pitch and roll sensing devices. A more elaborate vertical reference may be employed including a vertical gyroscope, or a system including a gyroscope with microwave controls and accelerometer controls may be used. An azimuth motor is contained in the stabilization box 27, having two terminal conductors 28. This motor rotates the antenna in the horizontal plane relative to the aircraft.

When a beam of microwave energy, radiated from an aircraft, strikes the earth and is reflected back to the aircraft, the frequency of the reflected energy differs from that transmitted. This difference is termed the Doppler frequency D, and has the value $$D = \frac{2V}{\lambda} \cos \gamma \qquad (1)$$

in which V is the aircraft speed in the direction of travel, $\lambda$ is the microwave length of the energy in free space, and $\gamma$ is the angle between the direction of travel of the aircraft and the direction of the beam.

Figure 2:
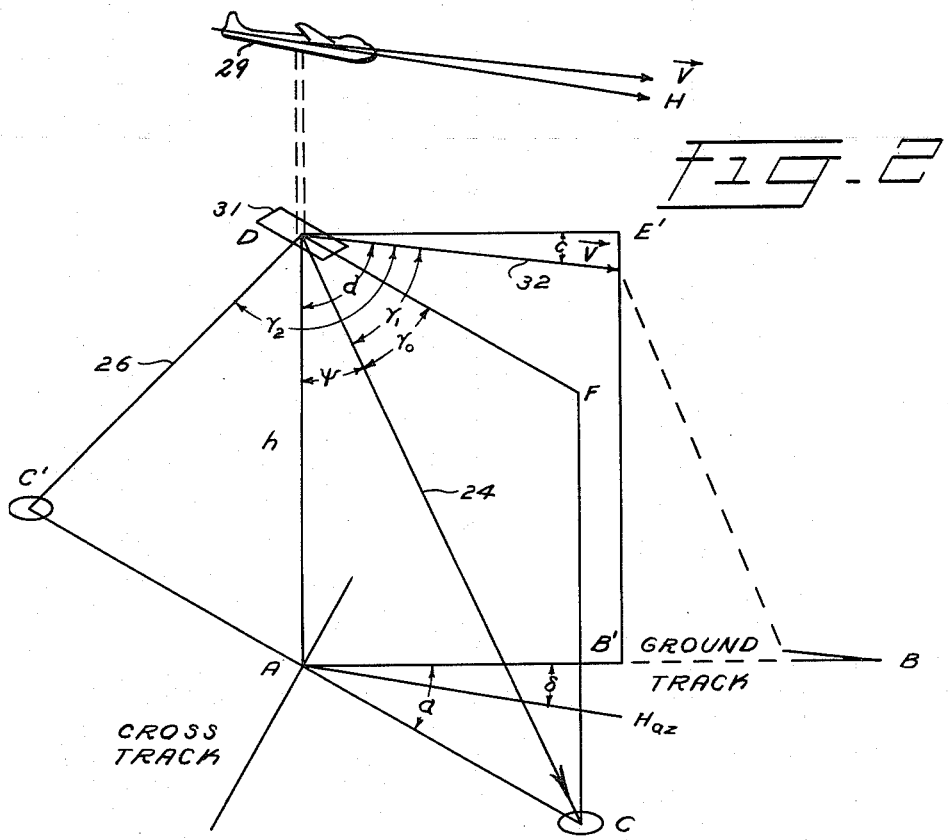
Figures 2 and 3 illustrate the space geometry of the problem.

The application of this relation to the present invention is illustrated in Fig. 2. In this figure an aircraft 29 is headed in the direction H, but because of drift its motion is in the direction of $\vec{V}$ at a speed V. The horizontally-maintained microwave antenna 31 is illustrated for clarity at D, separated from the airplane symbol. The direction of antenna travel is indicated by the arrow 32 in the direction of $\vec{V}$, and is in the construction plane indicated by the letters AB'E'D. The line AB' is therefore the ground track of the aircraft, and the line $AH_{az}$ is the ground projection of the heading direction H, at azimuth angle $\delta$ to the ground track. The aircraft is in a dive measured by the angle $c$. The antenna's longitudinal axis points in the direction of the horizontal line DF. This line forms the top edge of a construction plane ACFD, and since the microwave beam 24 lies in the vertical plane through the antenna axis as has been stated, it lies in this plane ACFD and is shown as having the direction DC. The other beam 26 strikes the ground at C', C'AC constituting a straight line and angle C'DA equalling angle ADC. The angle $\gamma_1$ is the angle between the direction of travel 32 and the beam direction 24, and the angle $\gamma_2$ is the angle between 32 and the other beam direction 26. The angle that the antenna makes with the ground track direction is termed $\alpha$. This angle is 90° when the antenna is aligned to the cross track direction. The complement of the angle $\gamma_0$ is termed $\psi$. The angle between the direction of travel and the vertical line joining the antenna to the earth is termed $d$, and is equal to $90+c$, $c$ being positive if a climb angle, and negative, if a dive angle.

By inspection of Fig. 2 it is evident that, when the antenna is misaligned with the cross track, the forward motion of the aircraft generates a Doppler frequency in each beam return, one being positive and the other an equal amount negative. Although negative frequency has no physical meaning, the meaning here is understood as indicating Doppler frequency derived from an echo frequency less than the transmitted frequency. By inspection it is also evident that a Doppler frequency is caused by vertical aircraft motion, being negative in climb and positive in dive.

When Equation 1 is applied to the two microwave beams, the Doppler frequencies secured by individual coherent demodulation of their echo energies are $$D_1 = \frac{2V}{\lambda} \cos \gamma_1 \qquad (2)$$

and $$D_2 = \frac{2V}{\lambda} \cos \gamma_2 \qquad (3)$$

The angles $\gamma_1$ and $\gamma_2$ may be expressed in terms of the angles $\gamma_0$, $c$, and $\alpha$, so that Equations 2 and 3 become $$D_1 = \frac{2V}{\lambda} (\cos \gamma_0 \cos c \cos \alpha - \sin \gamma_0 \sin c) \qquad (4)$$

$$D_2 = \frac{2V}{\lambda} (-\cos \gamma_0 \cos c \cos \alpha - \sin \gamma_0 \sin c) \qquad (5)$$

Figure 3:
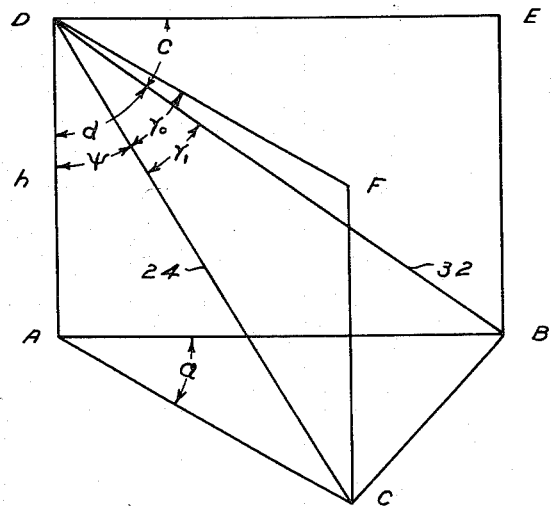

The geometric derivation of these equations is facilitated if $c$ be made negative as drawn, the line 32 being prolonged to meet the line AB' at B. The construction for this purpose then is simplified as illustrated in Fig. 3.

By adding Equations 4 and 5 there is obtained $$D_1 + D_2 = \frac{2V}{\lambda}(-2 \sin \gamma_0 \sin c) \qquad (6)$$

When an in-phase array and rectangular waveguide are employed, $$\sin \gamma_0 = \frac{\lambda}{2a} \qquad (7)$$

in which $a$ is the larger inside cross-sectional dimension of the waveguide. Equation 6 then becomes $$D_1 + D_2 = -\frac{2V}{a} \sin c \qquad (8)$$

But $V \sin c$ expresses the vertical velocity of the aircraft $V_z$ so that $$D_1 + D_2 = -\frac{2}{a} V_z \qquad (9)$$

or the sum of the Doppler frequencies equals the vertical velocity multiplied by a constant. It is evident that, since Equation 9 does not contain either the transmitted frequency or any function thereof such as the wavelength of the energy in the guide, the values obtained for the vertical velocity are unaffected by changes in the transmitted microwave frequency.

If Equations 4 and 5 be subtracted there is obtained the expression $$D_1 - D_2 = \frac{4V}{\lambda} \cos \gamma_0 \cos c \cos \alpha \qquad (10)$$

When the antenna is oriented to cross track, the value of $\cos \alpha$ becomes zero and therefore the value of this entire expression becomes zero. Since this is a nulling operation, errors in any terms of this equation caused by variation of the microwave transmitted frequency do not affect the null position of the antenna. When the antenna has been nulled to cross track in accordance with Equation 10, measurement of its angular position relative to the aircraft axis provides the complement of the drift angle, from which the drift angle itself is secured.

Instrumentation of this invention is based on Equations 9 and 10, with means for determining whether $\alpha$ is larger or smaller than 90° so that, in servoing the antenna to cross track, the antenna can be caused to rotate in the proper direction to reduce the error signal. Means are also provided to determine the sign of $V_z$ so that dive may be distinguished from climb.

Figure 4:
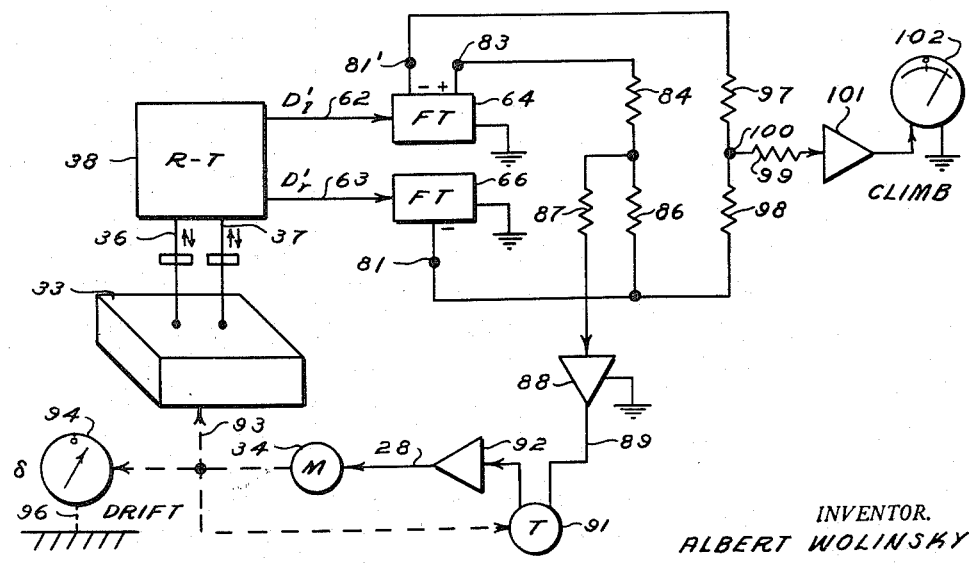
Figure 4 is a block diagram depicting one form of instrumentation of the invention.

Figure 4 shows the larger components of one embodiment of this invention. The block 33 represents the stabilized antenna of Fig. 1, but with the azimuth motor 34 separately depicted. The two linear arrays of the antenna are separately connected by microwave conductors 36 and 37 to a dual receiver-transmitter 38 which receives the echo signals from the two arrays, demodulates and amplifies them, and generates two signals representing the two Doppler frequencies of the two echoes. These two signals have the property that they not only represent frequency magnitudes but also frequency senses in the meaning that a "positive" Doppler frequency is derived from an echo signal having a frequency higher than the transmitted frequency, and a "negative" Doppler frequency is derived from an echo signal having a frequency lower than the transmitted frequency.

One suitable form of receiver-transmitter 38 is indicated in Fig. 5. A continuous-wave microwave generator 39 having a frequency $f$ energizes a modulator 41 which is modulated by a pulse generator 42. This assembly of components provides coherence of all received pulses. However, other pulse transmitters or a continuous-wave transmitter may be used.

One-half of the pulsed energy is applied through a power divider 43 and a duplexer 44 to the antenna conductor 36 and the left antenna array 11. The remaining half of the transmitted energy is applied through a duplexer 46 to the antenna conductor 37 and the right antenna array 12. The received echo energies which are secured from the duplexers contain the Doppler information having the frequencies $f \pm D_l$ and $f \pm D_r$, in which $D_l$ and $D_r$ are the Doppler frequencies contained in the left and right echoes, respectively. These signals are applied to mixers 47 and 48.

A small fraction of the transmitted energy is applied through mixer 49, where it is modulated to generate an intermediate frequency (I. F.) of, say 30 mc. p. s., to a coherent oscillator (COHO) 51. This oscillator operates continuously but is phased at every pulse by the energy applied from mixer 49. Part of the coherent oscillator output is applied through an automatic frequency control circuit 52 to a local oscillator 53 having a frequency equal to the sum of the transmitted and the intermediate frequencies, $f+$I. F. This local oscillator frequency is applied to mixer 49 to modulate the transmitted frequency. The local oscillator energy is also applied to a power divider 54 which divides the energy into two equal parts. These energies are applied to mixers 47 and 48, in which they modulate the input signals $f \pm D_l$ and $f \pm D_r$ to form intermediate-frequency signals containing the Doppler information and having the frequencies I. F. $\pm D_l$ and I. F. $\pm D_r$. These signals are applied to two similar receivers 56 and 57 containing intermediate amplifiers, detectors, and low-frequency amplifiers.

In order to distinguish a "positive" from a "negative" Doppler frequency at the receiver output it is necessary to distinguish, for example, in the signal applied to mixer 47 between $f+D_l$ and $f-D_l$. This is effectively accomplished by applying a heterodyne demodulating signal to the receivers 56 and 57 which differs from the intermediate frequency by a small amount. This amount must be no smaller than the maximum Doppler "positive" or "negative" range. For example, if the maximum Doppler range of frequency to be measured is from zero to 10,000 cycles per second, the modulating frequency will be satisfactory if it differs from the intermediate frequency in either direction by 10,000 C. P. S.

In this embodiment the output of coherent oscillator 51 is applied to a mixer 58 to which is also applied from generator 59 a sinusoidal modulating signal having a frequency of 10,000 C. P. S. The modulated output contains the two sideband frequencies of I. F.+10,000, and I. F.—10,000. The former is selected by a filter 61 which removes the carrier and lower sideband frequencies and transmits the modulated frequency of I. F.+10,000 C. P. S. to receivers 56 and 57. Here this frequency modulates the receiver inputs resulting in outputs having the frequencies $10,000 \pm D_l$ and $10,000 \pm D_r$. This is, the positive Doppler frequency signals are now represented by signals having frequencies between zero and 10,000 C. P. S., and the negative signals are represented by signals having frequencies between 10,000 and 20,000 C. P. S. These constitute the output signals of the receivers on conductors 62 and 63, and are termed $D_l'$ and $D_r'$.

Returning to Fig. 4, the signals $D_l'$ and $D_r'$ on conductors 62 and 63 are applied to separate frequency trackers 64 and 66. These frequency trackers are similar and conventional, and are like that described in copending application Serial No. 314,306, filed October 11, 1952. They are briefly described as follows.

The signal $D_l'$ on conductor 63, Figs. 4 and 6, of tracker 66 is applied to a modulator 67, Fig. 6, together with the output of an oscillator 68. The modulation product is discriminated and rectified in amplifier 69, filters 70 and 71, amplifiers 72 and 73, and detectors 74 and 76, and subtracted in network 77 to form a direct current signal representing in sense and amount the divergence of the modulator output frequency from the selected median frequency of filters 70 and 71. This positive or negative error signal is applied to an integrating amplifier 78 which produces an output signal representing the time integral of its input signal. This integrated signal is applied through conductor 79 to control the direct current bias of oscillator 68 and thereby to control its frequency linearly. This oscillator output, applied to modulator 67, heterodynes the Doppler frequency input to a higher frequency equal to the aforesaid selected frequency. The potential applied to conductor 79 is always negative, and, being proportional to the median Doppler spectrum frequency, it taken at terminal 81 as the output of the frequency tracker.

The frequency tracker 64, Fig. 4, is identical with tracker 66 just described except for the addition of a polarity inverter. This is depicted in Fig. 7, which contains an inverter and is to be substituted in Fig. 6 for the portion of the diagram below the dashed line X—X. The tracker of Fig. 7 therefore has two outputs, equal in amplitude but opposite in polarity. The potential derived at terminal 81' is negative and the potential derived at terminal 83 from the inverter is positive.

The negative and positive potentials of terminals 81 and 83, Fig. 4, are applied to an adding device consisting of a resistance network having resistors 84, 86, and 87, and the output is applied to amplifier 88. The amplifier output has magnitude and sense representing the algebraic sum of the potentials of terminals 81 and 83 and therefore of the frequencies $D_r'$ and $D_l'$. If $D_l'$ be larger than $D_r'$, the potential in output conductor 89 is positive and represents the difference by its magnitude. If $D_r'$ be larger, the potential is negative, and represents difference by magnitude, and if $D_r'$ equals $D_l'$, the potential is zero.

The potential of conductor 89 is applied as an error signal to a servomechanism comprising the motor 34, series negative feedback tachometer 91 and amplifier 92. The motor shaft 93 drives the antenna in azimuth, and, in accordance with the control exerted by the error signal, positions the antenna so that $D_l'$ becomes equal to $D_r'$. In this position the antenna is oriented to the cross track, and a mechanical indicator 94, secured to the airframe as indicated by dashed line 96 and actuated by shaft 93, indicates the drift angle directly.

The negative potential of terminal 81' representing the quantity $D_l'$ is added in equal adding resistors 97 and 98 to the negative potential of terminal 81 representing $D_r'$. The sum secured from the median terminal 100 through resistor 99 and amplifier 101 is indicated on center-zero meter 102. This meter is marked directly in units of vertical velocity, positive potential being indicated as climb speed and negative potential as dive speed. The indications of this meter do not depend upon the nulling operation and are equally accurate at any stage of the drift servomechanism nulling operation.

What is claimed is:

1. An aircraft measuring system comprising, Doppler microwave antenna-receiver-transmitter means emitting two signals containing Doppler amplitude and sense information, means algebraically subtracting said two signals to form an error signal, means responsive thereto positioning said first-named means to cross-track, and means algebraically adding said two signals to form a vertical velocity signal.

2. An aircraft measuring system comprising, a pair of Doppler microwave linear arrays, receiver-transmitter means developing from said arrays a pair of signals containing Doppler frequency information and echo sense information, means algebraically subtracting said pair of signals to form an error signal, means responsive to said error signal positioning said pair of arrays to cross-track direction, and means algebraically adding said pair of signals to form a vertical velocity signal.

3. An aircraft measuring system comprising, a Doppler microwave antenna including a pair of linear arrays, receiver-transmitter means energizing said pair of arrays to produce a pair of radiation beams which are directed towards the earth and reflected therefrom, said receiver-transmitter means developing from the respective echoes of said beams a pair of signals containing Doppler frequency sense information, means for obtaining the algebraic difference of said pair of signals to produce an error signal, means controlled by said error signal positioning said pair of arrays to cross-track direction, and other means for obtaining the algebraic sum of said signals to produce a vertical velocity signal.

4. An aircraft microwave system for measuring vertical velocity and drift angle independent of transmitted frequency comprising, a Doppler microwave antenna comprising linear arrays limited to two, transmitter means energizing said antenna to form two beams of microwave radiation, said two beams being directed toward the earth and being reflected therefrom to provide two echo signals, receiver means developing from said two echo signals two Doppler signals containing Doppler frequency information and information representing the sense of the difference of the transmitted and the echo signal frequencies, means for obtaining the algebraic difference of said two Doppler signals to form an error signal, means controlled by said error signal positioning said antenna to cross-track direction, and other means for obtaining the algebraic sum of said two signals to form a vertical velocity signal.

5. An aircraft microwave system for measuring vertical velocity and drift angle independent of transmitted frequency comprising, a microwave antenna comprising horizontally stabilized parallel linear arrays limited to two, transmitter means energizing said antenna to form two beams of microwave radiation, said two beams being directed toward the earth and being reflected therefrom to provide two echo signals, receiver means developing from said two echo signals two information signals containing Doppler frequency information and information representing the sense of the difference of the transmitted and the echo frequencies, means for obtaining the algebraic difference of said two information signals to form an error signal, servomechanism means controlled by said error signal positioning said antenna to a direction perpendicular to the ground-track direction of said aircraft, means actuated by said antenna position indicating the aircraft drift angle, and means algebraically adding said two information signals to form a signal representing the magnitude and sense of the vertical velocity of said aircraft.

6. A microwave system for measuring vertical velocity and drift angle independent of transmitted frequency self-contained on an aircraft comprising, a microwave antenna consisting of only two identical in-phase linear arrays, said two arrays being positioned parallel and close together in a horizontal plane, means horizontally stabilizing said two arrays, a transmitter feeding said arrays at opposite ends whereby each array emits a beam of radiation downward in its axial vertical plane at a selected angle to the vertical direction, said selected angle being the same for each array but on opposite sides of the vertical line through the center of the antenna, said two beams striking the earth and being reflected therefrom as two echo signals, receiver means developing from said two echo signals two information signals containing Doppler frequency information and information representing the sense of the difference of the transmitted and the echo frequencies, means for obtaining the algebraic difference of said two information signals to form an error signal, servomechanism means controlled by said error signal positioning said antenna to a direction perpendicular to the ground-track direction of said aircraft, means actuated by said antenna position indicating the aircraft drift angle, and means algebraically adding said two information signals to form a signal representing the magnitude and sense of the vertical velocity of said aircraft.

7. An aircraft measuring system comprising, a Doppler microwave antenna including two linear arrays, receiver-transmitter means energizing said two arrays to form two radiation beams, said two beams being directed towards the earth and being reflected therefrom to produce two echo signals, said receiver-transmitter means having said echo signals impressed thereon and developing therefrom a pair of information signals containing Doppler frequency and sense information, circuit means for producing an error signal representative of the algebraic difference of the Doppler frequency information contained in said two information signals, means controlled by said error signal for positioning said two arrays to cross-track direction, and circuit means producing a vertical velocity signal representative of the sum of the Doppler frequency information contained in said two information signals.

8. An aircraft drift angle and vertical velocity measuring system comprising, a horizontally stabilized Doppler microwave antenna limited to two parallel linear in-phase arrays emitting two beams in a vertical plane towards the earth's surface, receiver-transmitter means responsive to the earth echoes of said beams and producing therefrom two respective spectrum signals, each of said spectrum signals having a frequency band equal to the sum of the Doppler frequency band contained in the associated echo and a selected constant frequency, the divergence of each of said spectrum signals from said selected frequency being proportional to the Doppler frequency band thereof, and representing by the sense of said divergence whether said associated echo frequency is more or less than the microwave transmitter frequency, frequency tracker means receiving said two spectrum signals and emitting therefrom two voltage signals representative respectively of the centers of said spectrum signals, means emitting an error signal representing the difference of said two voltage signals, means responsive to said error signal servoing said antenna to cross-track whereby drift angle is indicated, and means emitting a vertical velocity signal representing the sum of said two voltage signals.

No references cited.